United States Patent [19]

Ouwerkerk et al.

[11] Patent Number: 5,093,823
[45] Date of Patent: Mar. 3, 1992

[54] CASSETTE WITH REMOVABLE DISC

[75] Inventors: Cornelius Ouwerkerk; Cornelis M. Beijersbergen Van Henegouwen; Wilhelmus J. F. Rath; Karel G. M. Koken, all of Eindhoven, Netherlands

[73] Assignee: U.S. Philips Corporation, New York, N.Y.

[21] Appl. No.: 668,803

[22] Filed: Mar. 7, 1991

Related U.S. Application Data

[63] Continuation of Ser. No. 272,182, Nov. 16, 1988, abandoned.

[30] Foreign Application Priority Data

Mar. 31, 1988 [NL] Netherlands ............... 8800820

[51] Int. Cl.⁵ ............... G11B 23/03; G11B 17/00; G11B 5/82
[52] U.S. Cl. ............... 369/291; 360/133; 206/444
[58] Field of Search ............... 369/291, 292; 360/133, 360/137; 206/444, 309

[56] References Cited

U.S. PATENT DOCUMENTS

| 4,443,874 | 4/1984 | Steenberg | 369/291 |
| 4,455,642 | 6/1984 | Inaba | 369/291 |
| 4,463,849 | 8/1984 | Prusak et al. | 369/291 |
| 4,755,982 | 7/1988 | Douwes | 360/133 |
| 4,862,448 | 8/1989 | Tanaka et al. | 369/291 |

Primary Examiner—Stuart S. Levy
Assistant Examiner—Kenneth B. Wells
Attorney, Agent, or Firm—David R. Treacy

[57] ABSTRACT

A cassette accommodates an information disc (1) which is rotatable inside a housing (2) and which can be read by means of a pick-up which is movable over the disc surface through an aperture (6) in a main wall (3). To enable the information disc to be exchanged rapidly and conveniently, the disc receiving space in the housing is readily accessible in that a shutter (16), which includes at least one of the transverse walls (4, 5, 17) of the housing, can be moved to an open position.

19 Claims, 4 Drawing Sheets

CASSETTE WITH REMOVABLE DISC

This is a continuation of application Ser. No. 07/272,182, filed Nov. 16, 1988 now abandoned.

BACKGROUND OF THE INVENTION

The invention relates to a cassette including an information disc and a housing having main walls disposed parallel to the disc and transverse walls interconnecting the main walls. The walls define an internal receiving space in which the information disc is mounted for rotation, at least one of the walls having an aperture for access of the pick-up to the disc surface inside the housing.

Such a cassette is known, for example, from the Applicant's prior European Patent Application 0,255,185 A1 U.S. application Ser. No. 860,729, herewith incorporated by reference). The relevant cassette has a single shutter which is slidable over the outside of the housing to close apertures formed in the two main walls of the housing for the access of a pick-up. For the remainder the housing is imperforate and comprises two shells which are interconnected permanently or semi-permanently, for example by gluing, ultrasonic welding etc. or by fixing means such as screws, which can be removed with the aid of a tool. The cassette is intended for a so-called DOR disc (Digital Optical Recording), which is permanently accommodated in the internal receiving space of the cassette.

It is not always desirable that information discs are permanently accommodated in cassettes. Some information discs, for example CD-ROM discs (Compact Disc Read Only Memory) are provided with a permanent program by means of a replica method. Such discs, just like normal Compact Discs, need not necessarily be accommodated in a housing because the information recorded on the disc is in principle protected against touching and soiling. However, in the case of professional discs, such as the CD-ROM discs, a protection is frequently desirable because the recorded information may be far more susceptible to read errors and, in addition, the disc may be far more valuable.

Therefore, such professional Compact Discs are sometimes also accommodated in a cassette. In accordance with a non-prepublished proposal, this may be achieved in a manner for a specific type of video disc, as in U.S. Pat. Nos. 4,361,884 and 4,463,850 (herewith incorporated by reference). These known cassettes include a housing basically consisting of a sleeve which is closed by a cross member of a disc holder at a front side. Limbs which engage around the video disc inside the sleeve are connected to the cross member. The cassette with the cross member facing forwards is bodily inserted into a slot in a player, the disc holder being released inside the player. When the sleeve is withdrawn the disc holder with the disc remains inside the player. When the sleeve is re-inserted into the player the disc is re-introduced into the sleeve and the disc holder is latched to the sleeve, after which the cassette can be removed from the player as a closed unit. In cassettes of this type it is not easy, and moreover it is generally not intended, to remove the disc from the cassette and to replace it by another disc. The latching means with which the disc holder is latched to the sleeve are so constructed that they cannot readily be opened by hand from the exterior, not even with the aid of tools.

SUMMARY OF THE INVENTION

Part of the housing is constituted by a door or end closure which is movable relative to the remainder of the housing between an open and a closed position, the door including at least a portion of one or more of the transverse walls of the housing. In the open position of the door or end closure the disc receiving space is accessible to allow the information disc to be readily exchanged.

The invention provides a cassette in which, due to the above steps, the receiving space of the cassette is conveniently and simply accessible in order to replace the information disc, without the correct operation of the cassette being adversely affected or without the dimensions of the cassette being increased. Moreover, the inventive step hardly leads to an increase in cost price of the cassette. Since the receiving space is readily accessible by moving the end closure this allows the other parts of the housing to be interconnected permanently, for example by integrated snap elements or by ultrasonic welding. Thus, the receiving space of the cassette is now readily accessible although the housing sections are secured to each other permanently. Securing the housing sections permanently to each other generally leads to a cost reduction, because no detachable fixing elements such as screws are needed. Another advantage is that a cassette of rugged and robust construction is obtained. This is because the two main walls are firmly interconnected by a plurality of transverse walls, which improves the rigidity of the cassette and its resistance to deformation.

In order to provide an effective fingerhold on the shutter, end closure may include portions of at least one of the main walls, which portions adjoin a transverse wall of the end closure. For an optimum accessibility of the receiving space and a satisfactory design of the cassette, it will generally be preferred to use a cassette which is substantially rectangular and the end closure includes one complete transverse wall of the four transverse walls and, if desired, portions of the two adjoining main walls. This last-mentioned embodiment is very suitable for combination with a further embodiment in which the end closure and the remainder of the housing are provided with corresponding labels, as a visual indication that the end closure and the remainder of the housing belong to one another. This effectively precludes mistakes and misplacement of end closures. If, as already stated in the foregoing, the end closure comprises a portion of at least one of the main walls of the cassette, the closure can be identified by a label which extends over a transverse wall and at least one adjoining main wall portion. An advantage of this embodiment is that without any problems and without additional labels being applied the characteristic features on the labels of the cassette can be readily observed both viewed from the back of the cassette and viewed at a main wall of the cassette.

Cassettes of the present type will generally be manufactured from a thermoplastic. Since thermoplastics generally have elastic properties it may be advantageous to use resilient latching means for snapping the door or end closure and the remainder of the housing onto each other in a latched position, and unlatching means which can be actuated by hand from the exterior. For latching and unlatching the end closure no additional separately mounted parts are needed. All the aforementioned embodiments of the invention may be employed in a cassette which is characterized in that the entire end closure is easy to remove by hand. Another possibility, which has the advantage that the end closure always remains connected to the cassette housing, is characterized in that the closure is formed as a door pivotally connected to the housing and is easily pivotable by hand.

DETAILED DESCRIPTION OF THE PREFERRED DRAWINGS

Figure 1:
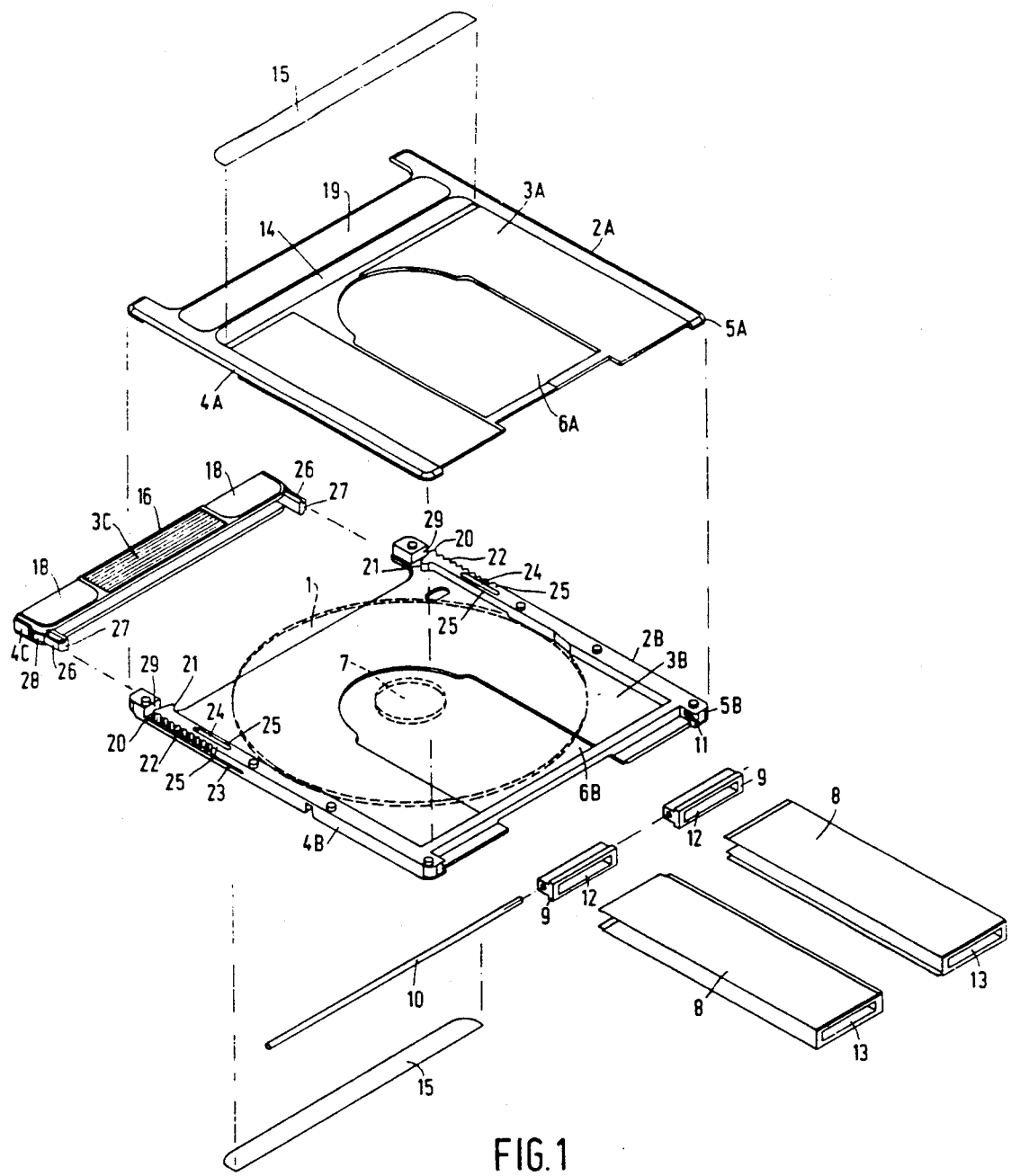
FIG. 1 is an exploded view of the cassette.
Figure 2:
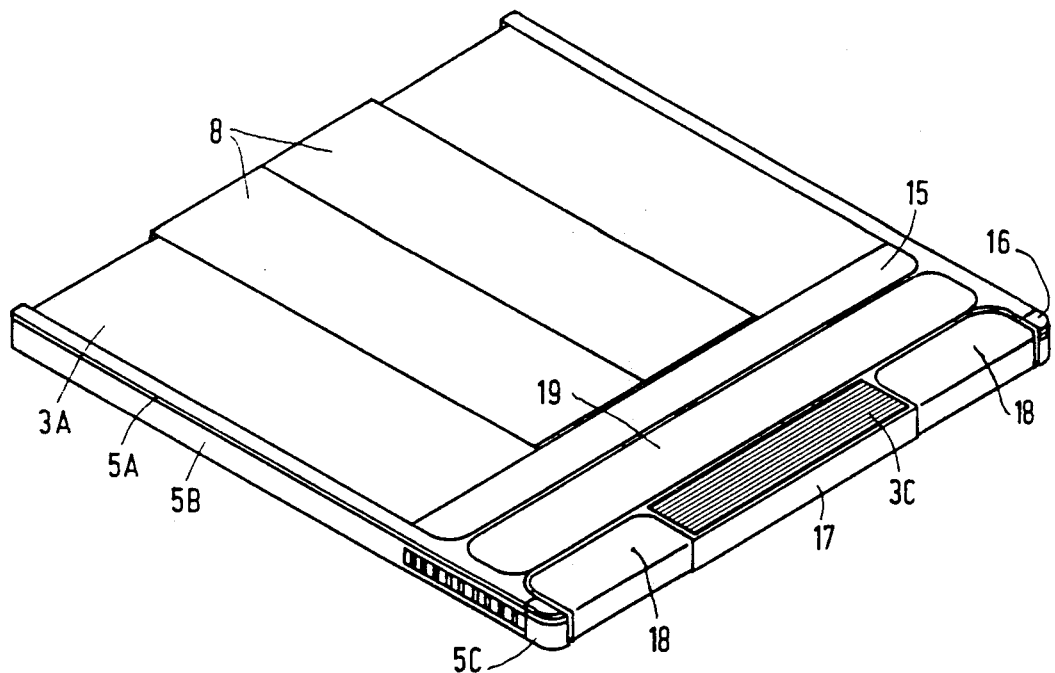
FIG. 2 is a perspective view to a different scale and viewed from an other side, showing the cassette of FIG. 1 in assembled form.
Figure 3:
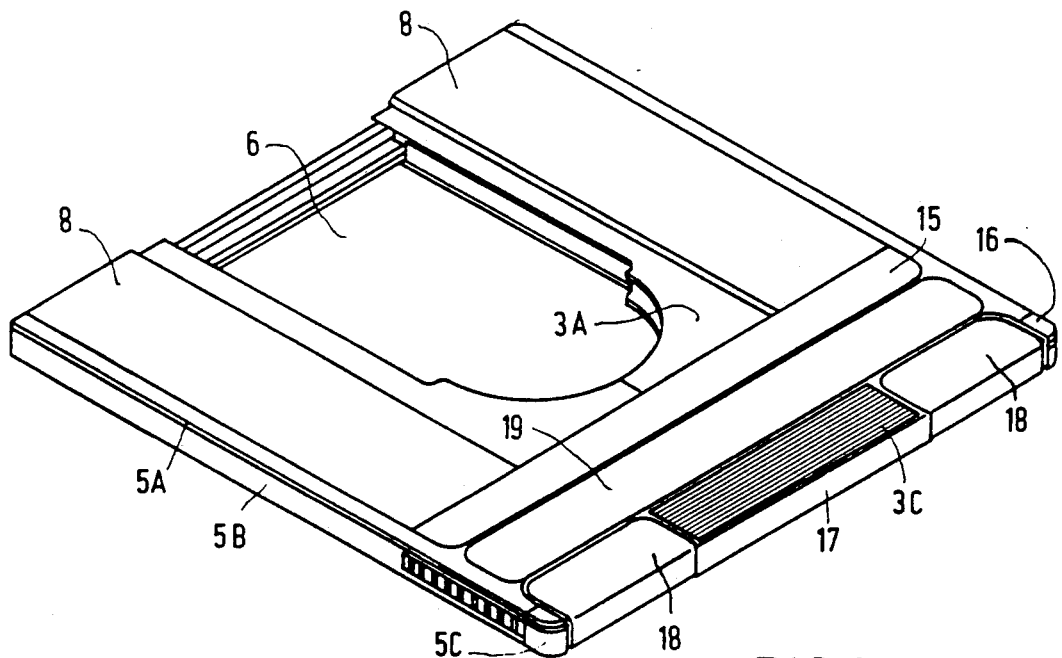
FIG. 3 is a view similar to that in FIG. 2 with the slides in the open position.

The cassette shown in FIG. 1 comprises a rotatable information disc in the form of a CD-ROM disc 1. Only the outlines of this disc are shown in broken lines. The information on the CD-ROM disc can be read by means of a pick-up, not shown, which moves parallel to the disc surface. Neither the CD-ROM disc nor the pick-up are of further relevance to the present invention.

The cassette comprises a housing comprising two shells 2A and 2B which are permanently interconnected. The shells comprise main walls 3A and 3B parallel to the information disc, and transverse or side walls 4A, 4B and 5A, 5B interconnecting said main walls. The walls define an internal receiving space in which the CD-ROM disc 1 is rotatable. The main walls 3A and 3B have apertures 6A and 6B respectively to provide access for a pick-up to the interior of the housing and to give centering and clamping means access to the center hole 7 of the CD-ROM disc. Two shutter slides 8, each mainly comprising a U-shaped strip of metal, are slidable over the exterior of the cassette to open and close the apertures 6A and 6B. Each of the slides is arranged on a plastic sliding block 9, which is mounted between the shells 3A and 3B at the front end of the housing so as to be slidable on a guide rod 10. Both ends of the rod 10 engage in recesses 11 in the side walls 4B and 5B of the shell 3B. At the front the sliding blocks 9 have elongate recesses 12 corresponding to the recesses 13 in the shutter slides 8. This enables the sliding block 9 to cooperate with means for opening the shutters 8 provided in the player. Normally, the shutters 8 will be urged into the closed position by resilient means. For the sake of simplicity the resilient means are not shown, but in principle they may be of a type as used for closing the shutter of the cassette known from the aforementioned European Patent Application 0,255,185 A-1.

A part of the housing is constituted by a cross member or end closure member 16 which is movable relative to the remainder of the housing between an open and a closed position. In the embodiment shown the cross member or closure comprises the entire transverse or rear end wall 17 of the housing adjoining the transverse walls 4A, 4B and 5A, 5B and a small portion 4C, 5C of said side walls 4B, 5B. In the open position of the closure 16 as shown in FIG. 1 the disc-receiving space between the main walls 3A and 3B is freely accessible to insert or remove a CD-ROM disc.

The two shutter slides 8 are connected to the sliding blocks 9 by suitable means, for example an adhesive. At their ends which are remote from the sliding blocks 9, the slides slide over a guide surface 14 provided on the main walls 3A and 3B. A metal strip 15 is arranged at some distance above the guide surface 14, so that the two ends of the slides 8 are guided between the guide surfaces 14 and the strips 15.

The end closure member 16 comprises portions 3C of the main walls 3A and 3B which adjoin the rear wall 17. The cassette is substantially rectangular and the closure 16 comprises the entire rear end wall 17 and the portions 3C of the main walls 3A and 3B and the portions 4C, 5C of the side walls 4B and 5B.

The cross member or closure 16 is provided with two labels 18, for example adhesive labels. The housing is provided with corresponding labels 19 on the main walls 3A and 3B. The labels 18 and the labels 19 correspond to one another, so that it can be ascertained visually that the closure 16 and the remainder of the housing belong to one another. This ensures that a closure cannot be mounted inadvertently onto another cassette, with the resulting confusion that the characteristic information on the label would no longer correspond to the information on the CD-ROM disc in the cassette. The labels 18 extend not only over a rear wall 17 but also over the two adjoining main wall portions 3C and can therefore be read conveniently from several sides.

The cassette shown in FIGS. 1 to 4 comprises resilient latching means for snapping the closure and the remainder of the housing onto each other in a latched position. The latching means can be released externally by hand—through apertures in the side walls 4A, 4B and 5A, 5B near the rear end of the housing. Each of the latching means comprises an insulating member 20 which is integral with the relevant side wall portion. At a free end each unlatching member 20 comprises an unlatching projection 21, and at one side of the side wall it comprises a ribbed actuating surface 22. At the side which is remote from the unlatching projection 21 the unlatching member is spaced from the main wall 3B by a slot 23. The portion between the unlatching projection 21 and the fixed end connected to the transverse wall has a through-going slot 24, so that locally the unlatching member comprises two parallel elastically deformable plastic leaf springs 25. By exerting pressure on the actuating surface 22 the leaf springs are deformed elastically and the unlatching projection 21 is moved inwards. As a result of the presence of the two parallel leaf springs 25 this movement is basically a translation.

At both sides the closure member 16 carries latching tongues 26. These tongues each have a curved shape and have a fixed end 27 rigidly connected to the latching member. They have a free end 28 which is deflected slightly outwards in its free position, see in particular FIG. 4. In the assembled condition the free end 28 engages behind the portion 29 of the side walls 4B and 5B of the shell 2B. By simultaneously pressing the ribbed actuating surfaces of the two latches 22 the projections 21 are pressed against the latching tongues 26, so that these tongues deflect inwards and the free ends 28 no longer engage behind the stop portions 29, allowing the closure to be readily removed.

The entire closure member 16 of the cassette shown in FIGS. 1 to 4 is easy to remove by hand. However, in the cassette shown in FIG. 5 the closure member is formed as a door pivotally connected to the housing, and can readily be pivoted by hand. The parts of the cassette shown in FIG. 5, insofar as they correspond to the parts of the cassette shown in FIGS. 1 to 4, bear the same reference numerals as in the preceding figures, but now a 5 has been prefixed to each numeral. Since the cassettes of FIGS. 1–4 and the cassette of FIG. 5 only differ at the location of the closure member, the latter will be described only insofar as it is different.

Figures 4, 5:
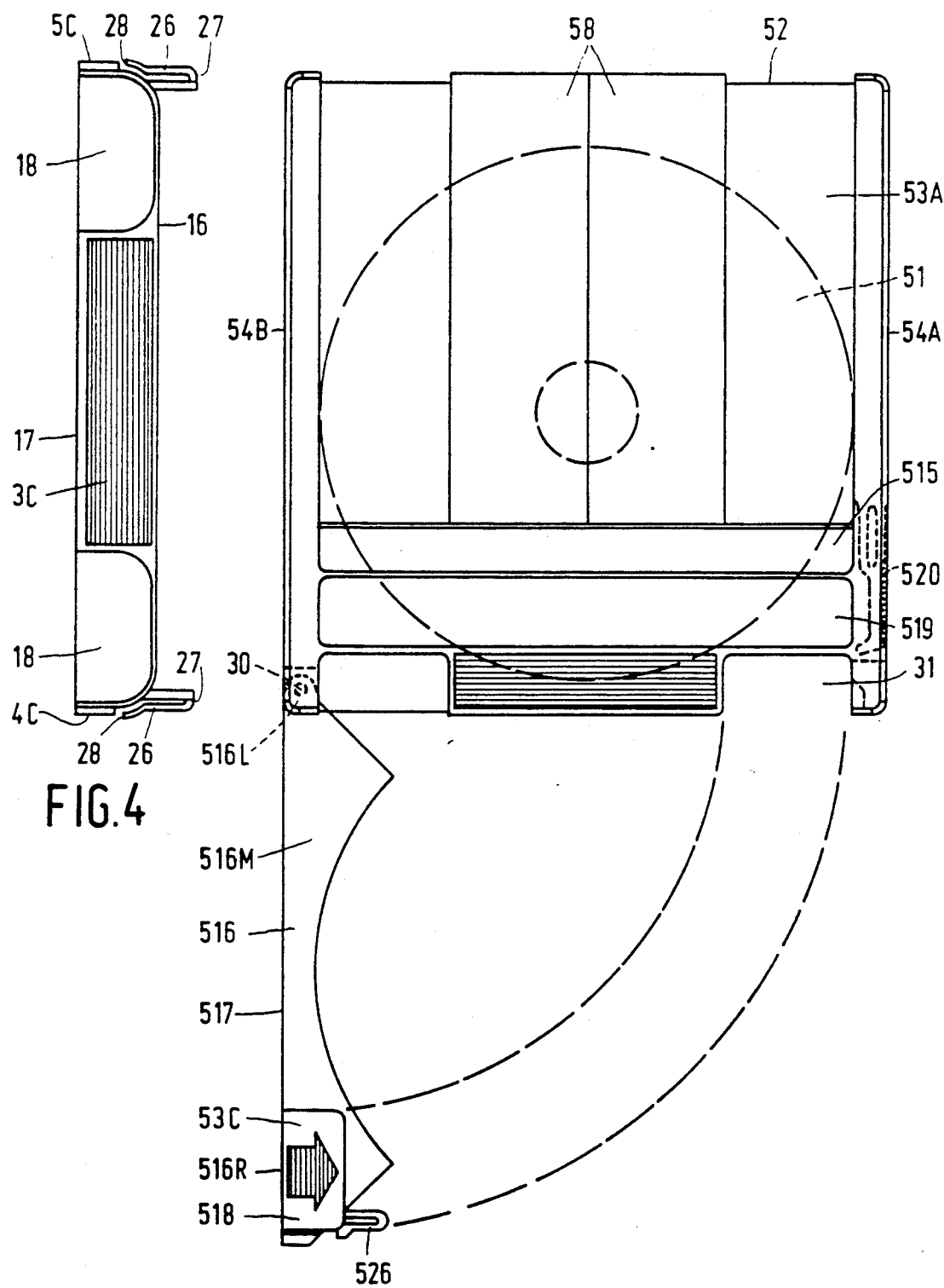
FIG. 4 is a different plan view scale showing the cassette of FIGS. 1 to 3.
FIG. 5 is a different-scale plan view of a modified embodiment of the invention.

In the plan view shown in FIG. 5 the door 516 is pivotally connected to the housing at the left hand end 516L by means of a pivot 30. The central portion 516M has such a thickness that it engages between the main walls 53A and 53B. Only the right hand portion 516R comprises a portion 53C which forms part of the main walls 53A and 53B. This portion 53C engages in a recess 31 in the housing when the door is in the closed position. It is provided with a label 518 which extends over the transverse wall 517 and the main wall 53C. At the right hand side 516R the door carries a single latching tongue 526 which cooperates with the latch 520 at the relevant side 54A of the cassette.

Figure 6:
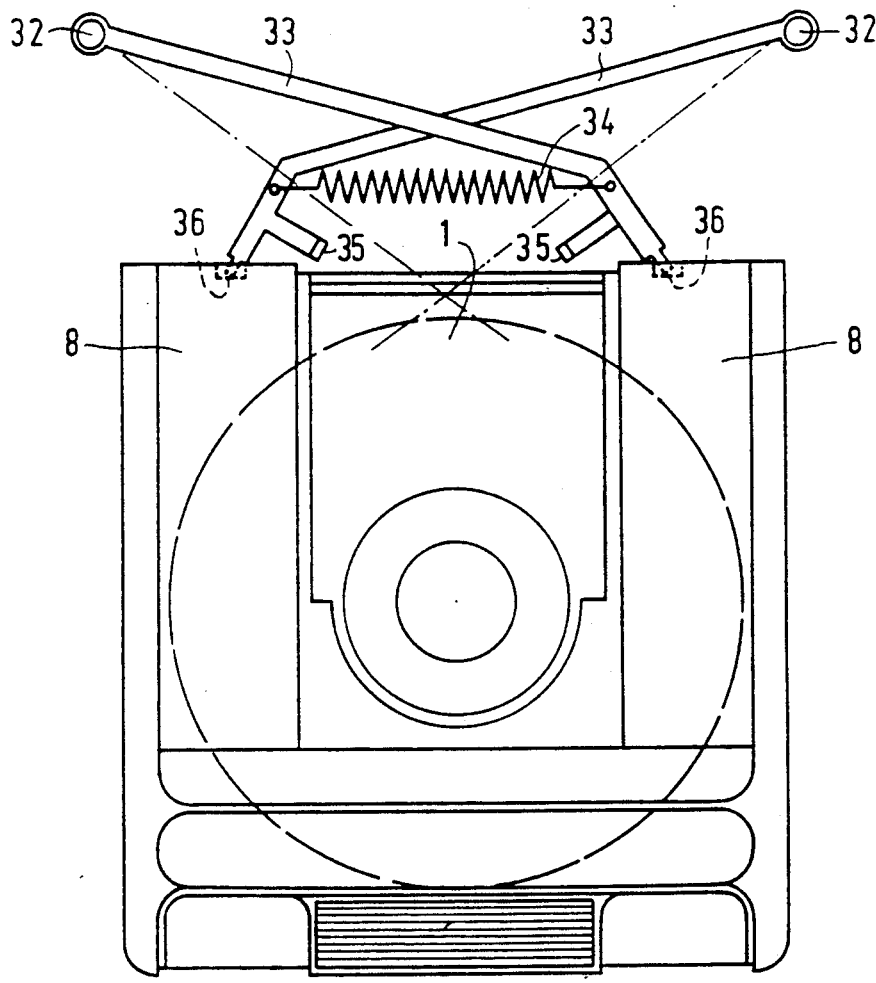
FIG. 6 illustrates the cooperation of a cassette as shown in FIG. 5 with means for opening to the two slides in a player.

As is shown in FIG. 6 a playback apparatus may comprise two pivotal arms 33 which are pivotable about pivots 32. The arms are urged towards one another by a tension spring 34 and comprise stops 35 which abut against each other when the arms are urged completely against one another. At their free end 36 the pivotal arms can engage the recesses 12 of the sliding blocks 9 of the cassette, so that when the cassette is moved forwards in the direction indicated by the arrow 37 the shutters 8 are slid into the open position shown in FIG. 6. In this position the cassette is latched in the playback apparatus by suitable means, not shown, and the CD-ROM disc can be played. During removal of the cassette from the playback apparatus the shutters 8 are closed and the levers 33 are moved towards one another.

Within the scope of the invention as defined by the appended claims numerous modifications are possible. For example, the end closure may be of another construction than described with reference to the drawings, although the inventive principle is applied, i.e. the step of providing a cassette intended to accommodate the disc both inside and outside the playback apparatus with a shutter at a technically appropriate location in order to enable the disc to be exchanged rapidly and conveniently.

Figures 7, 8:
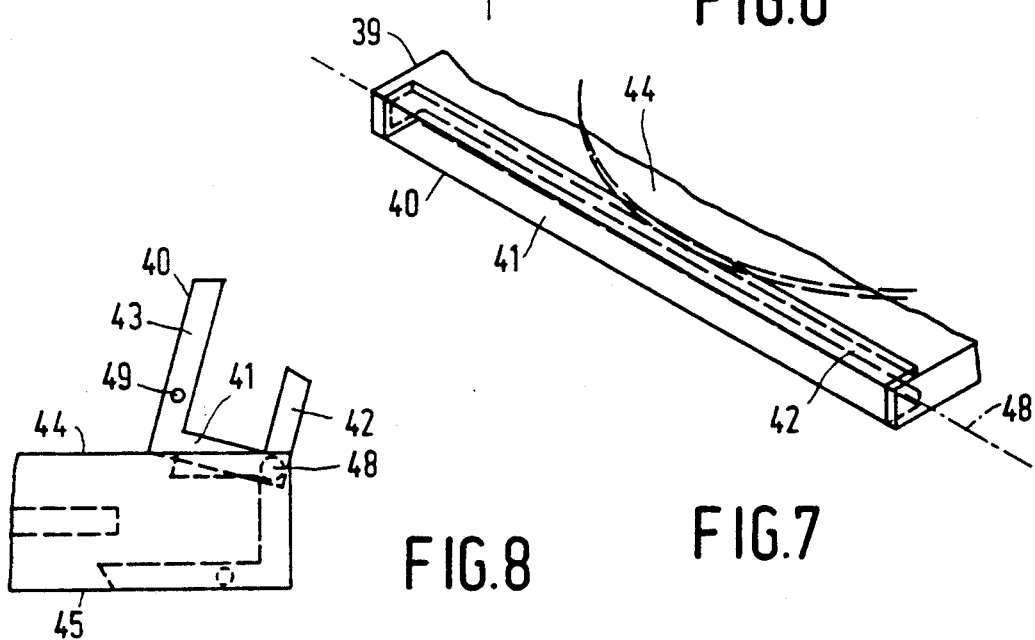
FIG. 7 is a perspective view showing a part of the cassette in a different embodiment.
FIG. 8 is an enlarged scale side view of the part of the cassette of FIG. 7 with the shutter shown in the open position.

FIGS. 7 and 8 show an example of such a modified embodiment. A housing 39 carries an end closure 40 comprising the rear wall 41 and portions 42, 43 of the main walls 44 and 45. The shutter fits between the side walls 46 and 47 and is pivotable about an axis 48 in the proximity of the upper wall 44. Projections 49 latch the shutter in the side walls in the closed position. This has the advantage that a cassette of very small width is possible.

What is claimed is:

1. A cassette comprising:
    a rotatable information disc having a disc surface, containing information readable by a pick-up which moves parallel to the disc surface, and
    a housing having two main walls disposed parallel to the information disc; two side walls interconnecting said main walls at opposite sides of the housing, the walls defining an internal receiving space in which the information disc is rotatable; and means for providing access to both sides of the disc for centering, clamping and rotating the disc while the disc is inside the housing, at least one of the main walls having an aperture located toward a first end of the housing for access of a pick-up to the disc surface inside the housing,
    characterized in that a part of the housing is constituted by an end closure disposed at a second end of the housing opposite said first end, which is movable relative to the remainder of the housing between an open and a closed position,
    the cassette comprises resilient latching means for snapping the end closure and the remainder of the housing onto each other in a latched position, and unlatching means permitting actuation by hand from the exterior,
    the end closure comprises at least a portion of one or both of said side walls at said second end of the housing, and
    in the open position of the end closure the disc-receiving space is accessible to allow the information disc to be readily exchanged.

2. A cassette as claimed in claim 1, characterized in that the end closure comprises a side wall part, and portions of at least one of said main walls, said portions adjoining said side wall part.

3. A cassette as claimed in claim 2, characterized in that the cassette is substantially rectangular, and the end closure comprises one complete end wall and adjoining portions of the two side walls.

4. A cassette as claimed in claim 2, characterized in that the end closure is provided with a label which extends over an end wall and at least one adjoining main wall portion.

5. A cassette as claimed in claim 1, characterized in that the end closure and the remainder of the housing are provided with corresponding labels, to provide a visual indication that the end closure and remainder of the housing belong to one another.

6. A cassette as claimed in claim 1, characterized in that the end closure is arranged such that the entire end closure is easy to remove by hand.

7. A cassette as claimed in claim 1, characterized in that the end closure is formed as a door pivotally connected to the housing, arranged to be easily pivotable by hand.

8. A cassette comprising:
    a rotatable information disc having a disc surface, containing information readable by a pick-up which moves parallel to the disc surface, and
    a housing having two main walls disposed parallel to the information disc, and two side walls interconnecting said main walls at opposite sides of the housing, the walls defining an internal receiving space in which the information disc is rotatable, at least one of the main walls having an aperture located toward a first end of the housing for access of a pick-up to the disc surface inside the housing,
    characterized in that a part of the housing is constituted by an end closure disposed at a second end of the housing opposite said first end, which is movable relative to the remainder of the housing between an open and a closed position, in the open position of the end closure the disc-receiving space being accessible to allow the information disc to be readily exchanged, and the cassette comprises latching means for latching the end closure in the remainder of the housing, including a latching member forming part of the end closure and disposed adjacent one of said side walls, arranged to be resiliently movable away from said adjacent one of the side walls for unlatching, and unlatching means for allowing access through said adjacent one of the side walls from the exterior of said housing to cause said latching member to move away from said adjacent one of the side walls and thereby unlatch the end closure.

9. A cassette as claimed in claim 8, characterized in that said unlatching means comprises an aperture formed in said adjacent one of said side walls, adjacent said second end.

10. A cassette as claimed in claim 9, characterized in that said latching means comprises two said latching members, one adjacent each side wall, and said unlatching means comprises a respective said aperture formed in each of said side walls, thereby permitting complete removal of said end closure by unlatching both latching members.

11. A cassette as claimed in claim 9, characterized in that the end closure is formed as a door pivotally connected to the housing at a location adjacent the other of said side walls, thereby allowing pivotal opening of said end closure upon unlatching of said latching means.

12. A cassette as claimed in claim 8, characterized in that said remainder of the housing comprises an unlatching member extending in a direction generally parallel to said adjacent one of the side walls, and having a free end accessible from the exterior of the housing for moving the free end inward to engage and move said resilient member, said unlatching member forming part of said unlatching means.

13. A cassette as claimed in claim 12, characterized in that said adjacent one of the side walls has an aperture formed therein adjacent said second end, said free end being accessible through said aperture.

14. A cassette as claimed in claim 13, characterized in that said latching means comprises two said latching members, one adjacent each side wall, and said unlatching means comprises two said unlatching members, one adjacent each side wall, and a respective said aperture formed in each of said side walls, thereby permitting complete removal of said end closure by unlatching both latching members.

15. A cassette as claimed in claim 13, characterized in that the end closure is formed as a door pivotally connected to the housing at a location adjacent the other of said side walls, whereby said end closure can be opened pivotally upon movement of said unlatching member by access through said aperture.

16. A cassette comprising:

a rotatable information disc having a disc surface, containing information readable by a pick-up which moves parallel to the disc surface, and a housing having two main walls disposed parallel to the information disc, and two side walls interconnecting said main walls at opposite sides of the housing, the walls defining an internal receiving space in which the information disc is rotatable, at least one of the main walls having an aperture located toward a first end of the housing for access of a pick-up to the disc surface inside the housing; and slidable shutter means for covering said aperture when in a closed condition, and allowing access to said disc surface when in an open condition, characterized in that the cassette comprises means for engaging said shutter means at said first end of the housing for moving the shutter means between the closed condition and the open condition, a part of the housing is constituted by an end closure disposed at a second end of the housing opposite said first end, which is movable relative to the remainder of the housing between an open and a closed position, in the open position of the end closure the disc-receiving space being accessible to allow the information disc to be readily exchanged, and the cassette comprises latching means for latching the end closure in the remainder of the housing, including a latching member forming part of the end closure and disposed adjacent one of said side walls, arranged to be resiliently movable away from said adjacent one of the side walls for unlatching, and unlatching means for allowing access through said adjacent one of the side walls from the exterior of said housing for actuation by hand to cause said latching member to move away from said adjacent one of the side walls and thereby unlatch the end closure.

17. A cassette as claimed in claim 16, characterized in that said unlatching means comprises an aperture formed in said adjacent one of said side walls, adjacent said second end.

18. A cassette as claimed in claim 17, characterized in that said latching means comprises two said latching members, one adjacent each side wall, and said unlatching means comprises a respective said aperture formed in each of said side walls, thereby permitting complete removal of said end closure by unlatching both latching members.

19. A cassette as claimed in claim 16, characterized in that the end closure is formed as a door pivotally connected to the housing at a location adjacent the other of said side walls, thereby allowing pivotal opening of said end closure upon unlatching of said latching means.

* * * * *